(12) United States Patent
Yoshioka et al.

(10) Patent No.: US 12,028,170 B2
(45) Date of Patent: Jul. 2, 2024

(54) TERMINAL, BASE STATION AND METHOD

(71) Applicant: NTT DOCOMO, INC., Tokyo (JP)

(72) Inventors: Shohei Yoshioka, Tokyo (JP); Satoshi Nagata, Tokyo (JP); Yanru Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 331 days.

(21) Appl. No.: 17/596,251

(22) PCT Filed: Jun. 11, 2019

(86) PCT No.: PCT/JP2019/023173
§ 371 (c)(1),
(2) Date: Dec. 6, 2021

(87) PCT Pub. No.: WO2020/250325
PCT Pub. Date: Dec. 17, 2020

(65) Prior Publication Data
US 2022/0321278 A1    Oct. 6, 2022

(51) Int. Cl.
*H04L 1/1829* (2023.01)
*H04W 4/40* (2018.01)

(52) U.S. Cl.
CPC ............. *H04L 1/1854* (2013.01); *H04W 4/40* (2018.02)

(58) Field of Classification Search
CPC ........ H04L 1/1854; H04W 4/40; H04W 92/18
See application file for complete search history.

(56) References Cited

U.S. PATENT DOCUMENTS

| | | | |
|---|---|---|---|
| 2017/0215183 A1 | 7/2017 | Gulati et al. | |
| 2021/0321380 A1* | 10/2021 | Zhao | H04L 1/1896 |
| 2022/0085921 A1* | 3/2022 | Zhang | H04L 1/1854 |
| 2022/0103292 A1* | 3/2022 | Hwang | H04W 72/23 |
| 2022/0158769 A1* | 5/2022 | Gou | H04W 72/23 |
| 2023/0291505 A1* | 9/2023 | Park | H04W 72/23 |

FOREIGN PATENT DOCUMENTS

| | | | |
|---|---|---|---|
| CN | 109792594 A | 5/2019 | |
| WO | WO-2020133504 A1 * | 7/2020 | H04L 1/1671 |

OTHER PUBLICATIONS

Office Action in the counterpart Chinese Application No. 201980097173.0, mailed May 4, 2023 (20 pages).
(Continued)

*Primary Examiner* — Edan Orgad
*Assistant Examiner* — Malick A Sohrab
(74) *Attorney, Agent, or Firm* — Osha Bergman Watanabe & Burton LLP

(57) ABSTRACT

A user apparatus includes a transmission unit configured to transmit sidelink data based on information for sidelink scheduling received from a base station apparatus; and a reception unit configured to receive feedback information with respect to the sidelink data from a user apparatus that has received the sidelink data, wherein the transmission unit transmits to the base station apparatus, based on a predetermined assumption, first HARQ-ACK information that is based on the feedback information, and second HARQ-ACK information with respect to data received by the reception unit from the base station apparatus.

6 Claims, 6 Drawing Sheets

(56) References Cited

OTHER PUBLICATIONS

International Search Report issued in PCT/JP2019/023173, mailed on Jun. 11, 2019 (5 pages).
Written Opinion of the International Searching Authority issued in PCT/JP2019/023173, mailed on Jun. 11, 2019 (5 pages).
3GPP TS 36.213 V14.3.0; "3rd Generation Partnership Project; Technical Specification Group Radio Access Network; Evolved Universal Terrestrial Radio Access (E-UTRA); Physical layer procedures (Release 14)"; Jun. 2017 (460 pages).
Fujitsu; "Discussion on HARQ-ACK feedback for NR-V2X"; 3GPP TSG RAN WG1 #96, R1-1901944; Athens, Greece, Feb. 25-Mar. 1, 2019 (8 pages).
Vivo, "Physical layer procedure for NR sidelink"; 3GPP TSG RAN WG1 Meeting #95, R1-1812307 (7 pages).
Extended European Search Report issued in European Application No. 19932729.7, dated Nov. 8, 2022 (11 pages).
Office Action issued in the counterpart Japanese Patent Application No. 2021-525461, mailed on Feb. 28, 2023 (9 pages).
Ericsson, "On Mode-1 HARQ indication to gNB"; 3GPP TSG-RAN WG1 Meeting #97, R1-1907138, Reno, US, May 13-17, 2019 (3 pages).
MediaTek Inc., "Multiple HARQ procedures and intra-UE UCI prioritization"; 3GPP TSG RAN WG1 Meeting #97, R1-1907724, Reno, Nevada, USA, May 13-17, 2019 (12 pages).
Office Action issued in counterpart Chinese Patent Application No. 201980097173.0 mailed on Feb. 6, 2024 (15 pages).

\* cited by examiner

TERMINAL, BASE STATION AND METHOD

TECHNICAL FIELD

The present invention relates to a user apparatus in a radio communication system.

BACKGROUND ART

In LTE (Long Term Evolution) and succeeding systems of LTE (e.g., LTE-A (LTE-Advanced), NR (New Radio) (also referred to as 5G)), technologies for direct communication between communication apparatuses (also referred to as Sidelink or D2D (Device to Device)) have been discussed in which UEs and the like perform direct communication without a base station gNB (see, for example, Non-patent document 1).

Also, implementation of V2X (Vehicle to Everything) has been discussed to develop technical specifications. Here, V2X is a part of ITS (Intelligent Transport Systems), which is a generic term for V2V (Vehicle to Vehicle) meaning a form of communication executed between vehicles; V2I (Vehicle to Infrastructure) meaning a form of communication executed between a vehicle and a road-side unit (RSU); V2N (Vehicle to Nomadic device) meaning a form of communication executed between a vehicle and a mobile terminal of the driver; and V2P (Vehicle to Pedestrian) meaning a form of communication executed between a vehicle and a mobile terminal carried by a pedestrian.

RELATED ART DOCUMENT

Non-Patent Document

NON-PATENT DOCUMENT 1: 3GPP TS 36.213 V14.3.0 (2017-06)

SUMMARY OF THE INVENTION

Problem to be Solved by the Invention

Channels for direct communication between terminals used in direct communication between terminals (sidelink technology) include the following channels.

A channel to transmit control information such as SCI (Sidelink Control Information) is referred to as a PSCCH (Physical Sidelink Control Channel), and a channel to transmit data is referred to as a PSSCH (Physical Sidelink Shared Channel). Also, in V2X of NR, support of HARQ (Hybrid Automatic Repeat Request) operations for PSCCH and PSCCH is specified, and a HARQ-ACK is transmitted on a direct communication feedback channel between terminals (Physical Sidelink Feedback Channel (PSFCH)).

In the sidelink transmission mode 1 in NR-V2X, a user apparatus 20A transmits a PSCCH/PSSCH to a user apparatus 20B based on SL (sidelink) scheduling determined by the base station apparatus 10. The user apparatus 20B transmits a HARQ-ACK to the user apparatus 20A on a PSFCH. The user apparatus 20A transmits a HARQ-ACK to the base station apparatus 10 on a PUCCH (Physical Uplink Control Channel)/PUSCH (Physical Uplink Shared Channel).

However, in the sidelink transmission mode 1 in NR-V2X, how to feed back HARQ-ACKs is not specified in detail.

The present invention has been made in view of the above points, and has an object to provide techniques that specify how to feed back HARQ-ACKs in direct communication between terminals scheduled by a base station apparatus. Note that the present invention is not limited to communication between terminals in V2X, and may be applied to any terminal.

Means for Solving the Problem

According to a disclosed technique, a user apparatus is provided that includes a transmission unit configured to transmit sidelink data based on information for sidelink scheduling received from a base station apparatus; and a reception unit configured to receive feedback information with respect to the sidelink data from a user apparatus that has received the sidelink data, wherein the transmission unit transmits to the base station apparatus, based on a predetermined assumption, first HARQ-ACK information based on the feedback information, and second HARQ-ACK information with respect to data received by the reception unit from the base station apparatus.

Effect of the Present Invention

According to the disclosed techniques, techniques that specify how to feed back HARQ-ACKs in direct communication between terminals scheduled by a base station apparatus are provided.

EMBODIMENTS FOR CARRYING OUT THE INVENTION

In the following, embodiments of the present invention (present embodiments) will be described with reference to the drawings. Note that an embodiment described below merely presents an example, and an embodiment to which the present invention is applied is not limited to the following embodiments.

(Sidelink Transmission Mode)

Sidelink transmission modes in NR-V2X will be described.

Figure 1:
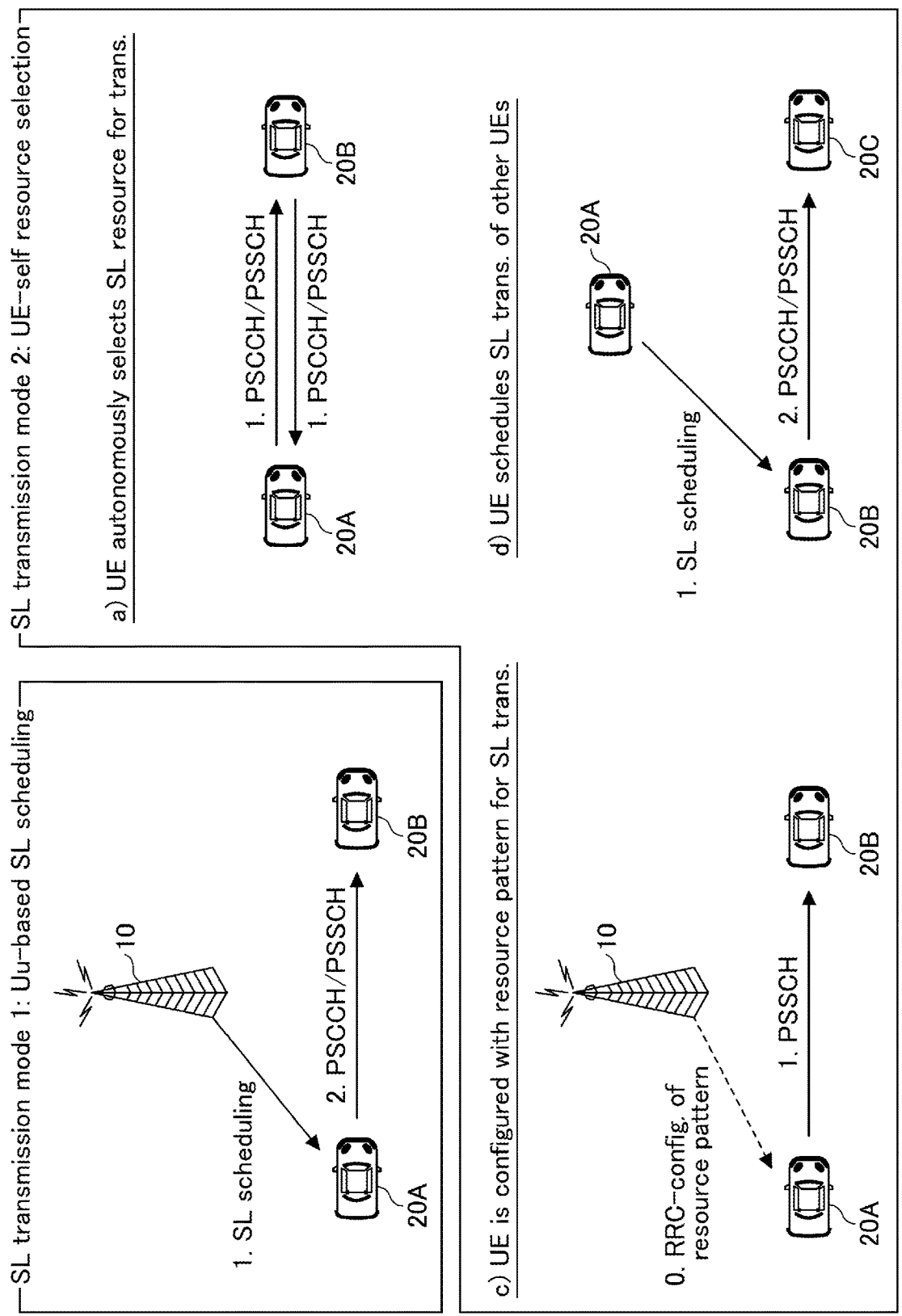
FIG. 1 is a diagram illustrating four types of sidelink transmission modes in NR-V2X.

FIG. 1 is a diagram illustrating four types of sidelink transmission modes in NR-V2X.

In the sidelink transmission mode 1 of NR-V2X, a user apparatus 20A transmits a PSCCH/PSSCH to a user apparatus 20B based on SL scheduling determined by a base station apparatus 10.

In the sidelink transmission mode 2 of NR-V2X, transmission of a PSCCH/PSSCH is performed based on resource selection determined by a user apparatus itself. The sidelink transmission mode 2 of NR-V2X is further subdivided; in the sidelink transmission mode 2-a of NR-V2X, the user apparatus 20A transmits a PSCCH/PSSCH to the user apparatus 20B based on the resource selection determined by the user apparatus 20A itself, and the user apparatus 20B transmits a PSCCH/PSSCH to the user apparatus A based on the resource selection determined by the user apparatus 20B itself. In the sidelink transmission mode 2-c of NR-V2X, the user apparatus 20A transmits a PSSCH to the user apparatus 20B according to RRC-config of a resource pattern indicated from the base station apparatus 10 or determined by the technical specifications.

In the sidelink transmission mode 2-d of NR-V2X, the user apparatus 20A transmits SL scheduling to the user apparatus 20B, to perform scheduling for transmission to be performed by the user apparatus 20B, and the user apparatus 20B transmits a PSCCH/PSSCH to the user apparatus 20A based on the scheduling.

(Harq Feedback)

HARQ feedback will be described.

Figure 2:
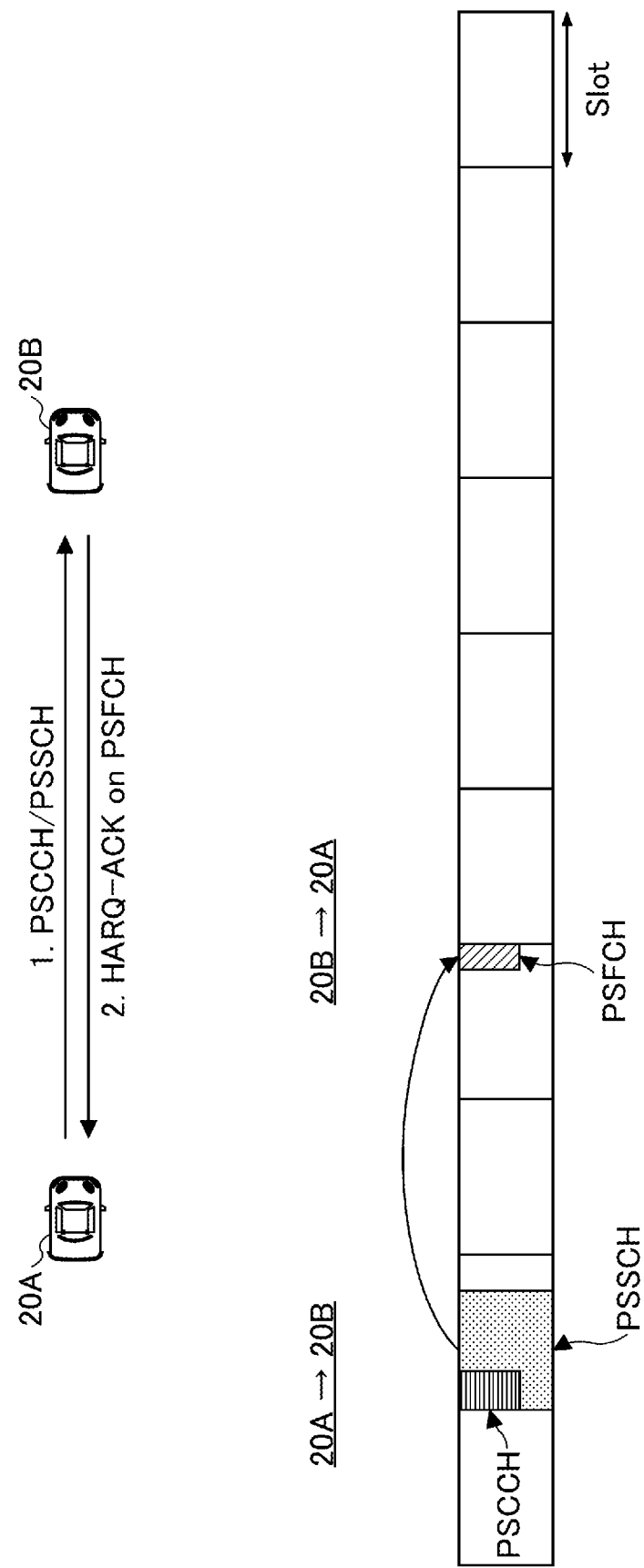
FIG. 2 is a diagram illustrating HARQ feedback on a sidelink.

FIG. 2 is a diagram illustrating HARQ feedback on a sidelink.

As illustrated in FIG. 2, at Step 1, a PSCCH/PSSCH is transmitted from the user apparatus 20A to the user apparatus 20B, and at Step 2, a HARQ-ACK for the PSCCH/PSSCH is transmitted on a PSFCH from the user apparatus 20B to the user apparatus 20A.

In the example in FIG. 2, the PSFCH is transmitted in the last symbol of the slot. Time-domain resources of the PSFCH are resources associated with the PSCCH/PSSCH and are not dynamically indicated. However, the present invention is not limited to the example in FIG. 2. For example, the PSFCH may be transmitted in a symbol other than the last symbol of the slot.

(HARQ Feedback in the Sidelink Transmission Mode 1)

Based on SL scheduling determined by the base station apparatus 10, in the sidelink transmission mode 1 in which a PSCCH/PSSCH is transmitted from the user apparatus 20A to the user apparatus 20B, a HARQ-ACK is fed back from the user apparatus 20A to the base station apparatus 10.

Figure 3:
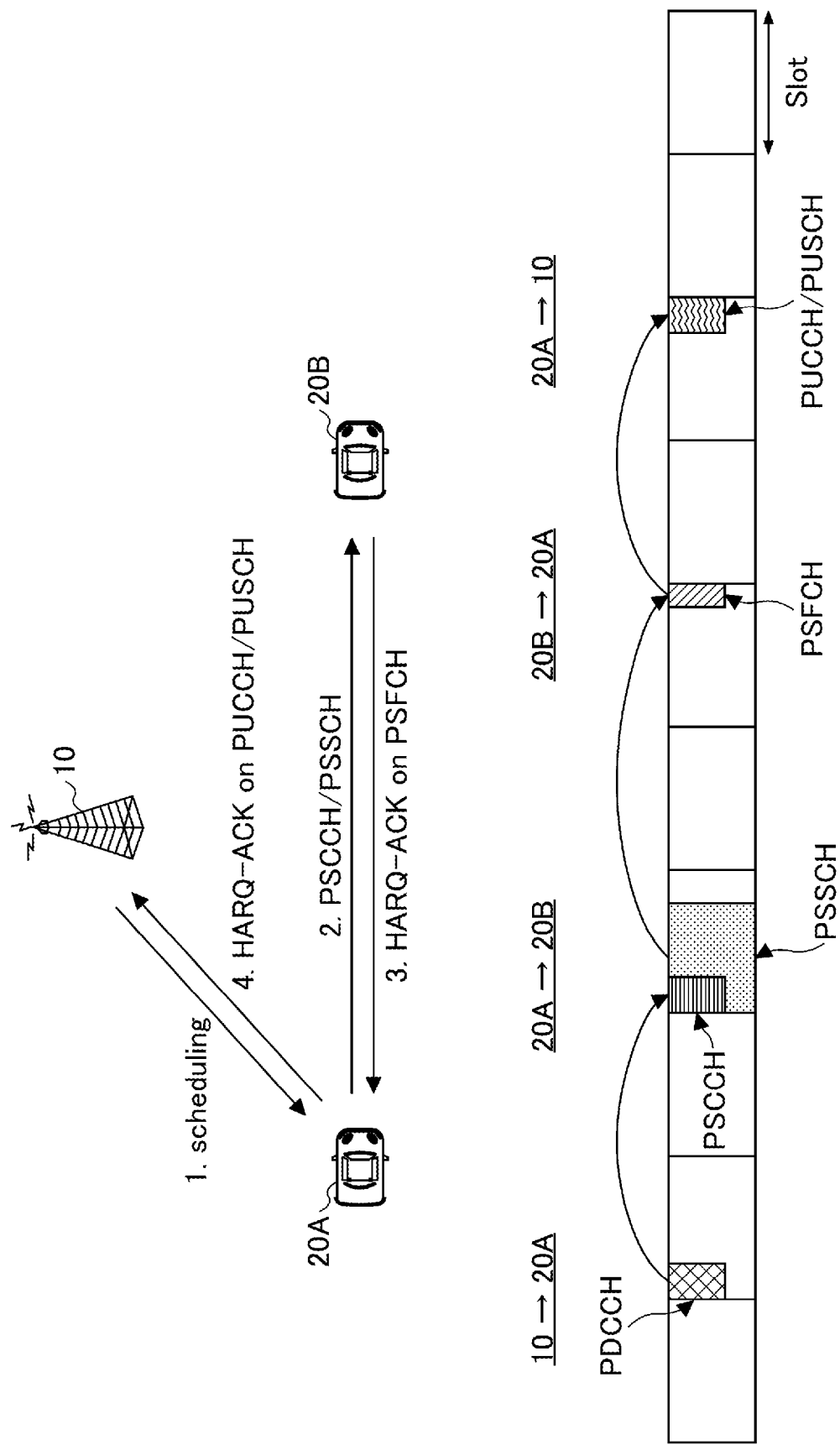
FIG. 3 is a diagram illustrating HARQ-ACK in the sidelink transmission mode 1.

FIG. 3 is a diagram illustrating HARQ-ACK in the sidelink transmission mode 1.

As illustrated in FIG. 3, at Step 1, SL scheduling is transmitted on a PDCCH from the base station apparatus 10 to the user apparatus 20A, and at Step 2, a PSCCH/PSSCH based on the SL scheduling is transmitted from the user apparatus 20A to the user apparatus 20B. At Step 3, a HARQ-ACK for the PSCCH/PSSCH is transmitted on a PSFCH from the user apparatus 20B to the user apparatus 20A, and at Step 4, a HARQ-ACK based on the above HARQ-ACK is transmitted from the user apparatus 20A to the base station apparatus 10 on a PUCCH/PUSCH. Note that the feedback procedure is not limited as such. For example, as Step 3, a HARQ-ACK for the PSCCH/PSSCH may be transmitted from the user apparatus 20B to the base station apparatus 10 on a PUCCH/PUSCH. Also, the base station apparatus 10 in the present invention may be replaced with a user apparatus 20C, a PUCCH may be replaced with a PSFCH, and a PUSCH may be replaced with a PSSCH. In this case, it may be assumed that the user apparatus 20C schedules PSCCH/PSSCH transmission from the user apparatus 20A to the user apparatus 20B. Also, DCI (Downlink Control Information) may be replaced with SCI (Sidelink Control Information).

Problems

As described above, it is assumed that HARQ feedback is supported in NR-V2X.

However, there has been a problem in that no specific proposal has been made on the details of HARQ feedback to the base station apparatus 10. More specifically, there are the following problems.

Problem A: There is a problem how to ensure the timing of HARQ feedback from the user apparatus 20A to the base station apparatus 10, while considering transmission of a PSFCH from the user apparatus 20B to the user apparatus 20A.

Problem B: There is a problem on how to multiplex a HARQ-ACK(SL HARQ-ACK) of the sidelink between the user apparatus 20A and the user apparatus 20B, and a HARQ-ACK(Uu HARQ-ACK) between the user apparatus 20A and the base station apparatus.

Problem C: There is a problem in that in the case where the same slot is indicated as a slot for feeding back an SL HARQ-ACK and a Uu HARQ-ACK, processing to be performed is not clearly specified in the case where the type of SL HARQ-ACK is a HARQ-ACK of eMBB (enhanced Mobile BroadBand) and the type of Uu HARQ-ACK is a HARQ-ACK of URLLC (Ultra-Reliable and Low Latency Communications). Also, there is a problem in that processing to be performed is not clearly specified in the case where the type of SL HARQ-ACK is a HARQ-ACK of eMBB and the type of Uu HARQ-ACK is eMBB. Also, there is a problem in that processing to be performed is not clearly specified in the case where the type of SL HARQ-ACK is a HARQ-ACK of URLLC and the type of Uu HARQ-ACK is eMBB. Also, there is a problem in that processing to be performed is not clearly specified in the case where the type of SL HARQ-ACK is a HARQ-ACK of URLLC and the type of Uu HARQ-ACK is URLLC. Problem D: There is a problem how to generate the HARQ-ACK bit for each type of HARQ-ACK codebook. Problem E: There is a problem in that processing to be performed is not clearly specified for a collision between a PUCCH including an SL HARQ-ACK and a PUCCH including another type of uplink control information (UCI type: Uplink Control Information type) such as CSI/SR. Here, CSI stands for Channel State Information, and SR stands for Scheduling Request. Also, the collision may mean a case where at least part of resources in at least one of the time domain, frequency domain, and code domain overlap in multiple channels.

(Supplementary Description of HARQ-ACK Terms)

Here, supplementary description will be added to terms including SL HARQ-ACK, Uu HARQ-ACK, eMBB HARQ-ACK, and URLLC HARQ-ACK in the above description.

The SL HARQ-ACK may mean a HARQ-ACK corresponding to a TB (Transport Block) transmission scheduled by a DCI (Downlink Control Information) format (DCI format) scheduling SL transmission. The term SL HARQ-ACK is an example, and another term may be used.

The Uu HARQ-ACK may mean a HARQ-ACK corresponding to a TB transmission scheduled by a DCI format (e.g., DCI format1_0, DCI format1_1) scheduling DL (Downlink) transmission. The term Uu HARQ-ACK is an example, and another term may be used.

The eMBB HARQ-ACK may mean an operation of a UE for eMBB and/or a HARQ-ACK corresponding to a TB transmission scheduled according to a DCI format associated with a low priority. For example, slot-based HARQ feedback, non-priority transmission, and the like may be listed. The term eMBB HARQ-ACK is an example, and another term may be used.

The URLLC HARQ-ACK may mean an operation of a UE for URLLC and/or a HARQ-ACK corresponding to a TB transmission scheduled according to a DCI format associated with a high priority. For example, subslot-based HARQ feedback and priority transmission, and the like may be listed. The term URLLC HARQ-ACK is an example, and another term may be used.

As a method of distinguishing (identifying) a DCI format for scheduling a TB transmission corresponding to an eMBB HARQ-ACK described above from a DCI format for scheduling a TB transmission corresponding to a URLLC HARQ-ACK, for example, the following method may be considered.

(1) DCI Format
As the above two DCI formats, it is possible to use different DCI formats.
(2) RNTI Scrambling DCI
As the above two DCI formats, it is possible to perform scrambling using different RNTIs.
(3) Coreset
As the above two DCI formats, it is possible to assign different CORESETs.
(4) Search Space
As the above two DCI formats, it is possible to assign different search spaces.
(5) Priority Level
As the above two DCI formats, it is possible to assign different priority levels.

Note that the terms "eMBB" and "URLLC" are intended to indicate different service types, and types other than these service types may be used.

Here, a HARQ-ACK codebook may be configured to include a bit for HARQ-ACK in at least one unit of a group of code blocks (Code Block Group (CBG)) constituting the time domain (e.g., slots), frequency domain (e.g., Component Carrier (CC)), spatial domain (e.g., layers), transport block (Transport Block (TB)), and TB. Note that CC is also referred to as a cell, serving cell, carrier, or the like. Also, the bit is also referred to as a HARQ-ACK bit, HARQ-ACK information, or a HARQ-ACK information bit, or the like. A HARQ-ACK codebook is also referred to as a PDSCH-HARQ-ACK codebook (pdsch-HARQ-ACK-Codebook), codebook, HARQ codebook, HARQ-ACK size, or the like. The number of bits (size) and the like included in a HARQ-ACK codebook may be determined semi-statically or dynamically. A semi-static HARQ-ACK codebook is also referred to as a Type I HARQ-ACK codebook, semi-static codebook, or the like. A dynamic HARQ-ACK codebook is also referred to as a Type II HARQ-ACK codebook, dynamic codebook, or the like.

Whether to use a Type I HARQ-ACK codebook or a Type II HARQ-ACK codebook may be configured in a UE by a higher-layer parameter (e.g., pdsch-HARQ-ACK-Codebook).

In the case of a Type I HARQ-ACK codebook, the UE may feed back a HARQ-ACK bit corresponding to a predetermined range (e.g., a range configured based on a higher-layer parameter) in the predetermined range regardless of whether or not the PDSCH is scheduled.

The predetermined range may be determined based on at least one of a predetermined period (e.g., a set of a predetermined number of candidate occasions for PDSCH reception, or a predetermined number m of monitoring occasions of monitoring the PDCCH), the number of CCs configured or activated in the UE, the number of TBs (the number of layers or ranks), the number of CBGs per TB, and whether or not spatial bundling is applied. The predetermined range is also referred to as a HARQ-ACK bundling window, HARQ-ACK feedback window, bundling window, feedback window, or the like.

In the case of a Type I HARQ-ACK codebook, the UE feeds back the NACK bit as long as included within the predetermined range, even in the case of no PDSCH scheduling for the UE. For this reason, in the case of using a Type I HARQ-ACK codebook, it may be expected that the number of HARQ-ACK bits to be fed back increases.

On the other hand, in the case of a Type II HARQ-ACK codebook, the UE may feed back a HARQ-ACK bit for the scheduled PDSCH in the predetermined range.

Specifically, the UE may determine the number of bits of the Type II HARQ-ACK codebook based on a predetermined field in the DCI (e.g., Downlink Assignment Indicator (Index) (DAI) field). The DAI field may be split into a counter DAI (counter DAI (cDAI)) and a total DAI (total DAI (tDAI)).

The counter DAI may indicate a counter value of downlink transmission (PDSCH, data, TB) scheduled within a predetermined period. For example, the counter DAI in the DCI that schedules data within the predetermined period may indicate the number counted first in the frequency domain (e.g., CC) in the predetermined period, and then, in the time domain.

The total DAI may indicate a total value (total number) of data scheduled within the predetermined period. For example, the total DAI in the DCI that schedules data at a predetermined time unit within the predetermined period (e.g., PDCCH monitoring occasion) may indicate the total number of data scheduled up to the predetermined time unit (also referred to as a point, timing, etc.) within the predetermined period.

The UE may transmit one or more HARQ-ACK bits determined (generated) based on a Type I or Type II HARQ-ACK codebook described above, by using at least one of a Physical Uplink Control Channel (PUCCH) and a Physical Uplink Shared Channel (PUSCH).

Problem A

As a target timing of the problem A on how to ensure the timing of HARQ feedback from the user apparatus 20A to the base station apparatus 10, while considering transmission of a PSFCH from the user apparatus 20B to the user apparatus 20A, it is possible to list PDCCH-to-HARQ feedback timing, PSCCH/PSSCH-to-HARQ feedback timing, PSFCH-to-HARQ feedback timing, and the like. The PDCCH-to-HARQ feedback timing is a timing from transmission and reception of a PDCCH between the base station apparatus 10 and the user apparatus 20A to HARQ feedback to the base station apparatus 10. The PSCCH/PSSCH-to-HARQ feedback timing is a timing from transmission and reception of a PSCCH/PSSCH between the user apparatus 20A and the user apparatus 20B to HARQ feedback to the base station apparatus 10. The PSFCH-to-HARQ feedback timing is a timing from transmission and reception of a PSFCH between the user apparatus 10A and the user apparatus 10B to HARQ feedback to the base station apparatus 10.

Figure 4:
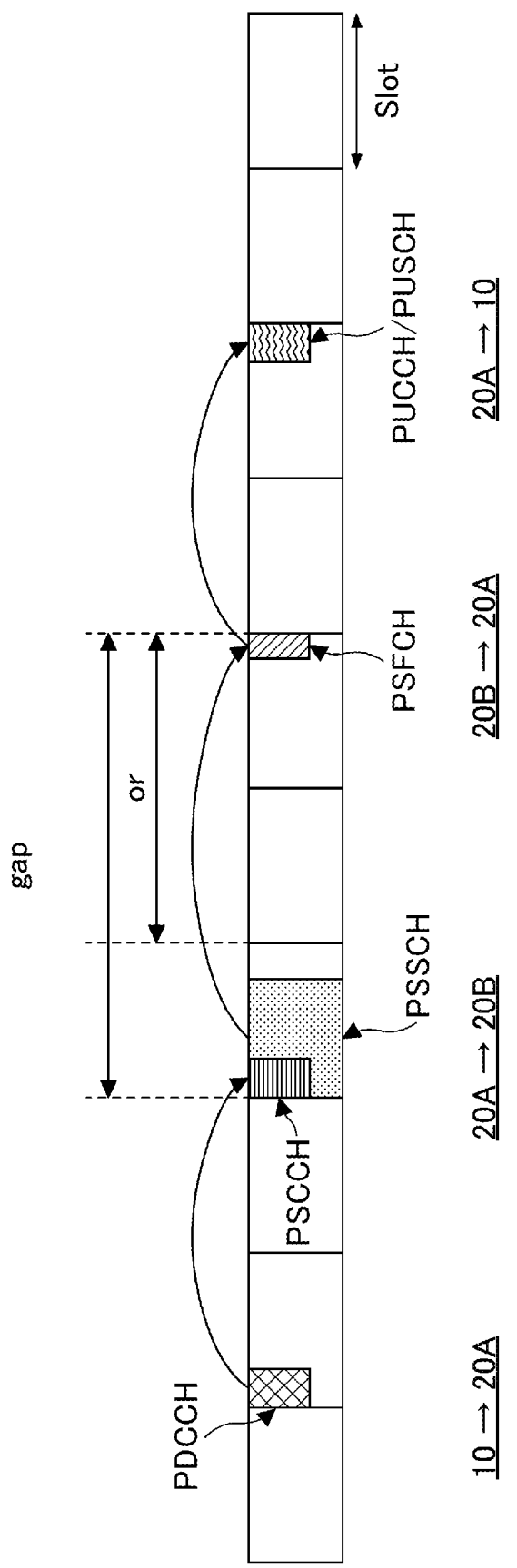
FIG. 4 is a diagram illustrating operations of a radio communication system in an embodiment.

FIG. 4 is a diagram illustrating operations of a radio communication system in an embodiment.

As an embodiment corresponding to the problem A, it is possible to consider indicating a gap (time difference) between a PSCCH/PSSCH and a PSFCH from the user apparatus 20A to the base station apparatus 10. Here, the gap between a PSCCH/PSSCH and a PSFCH is a gap between transmission and reception of the PSCCH/PSSCH between the user apparatus 20A and the user apparatus 20B, and transmission and reception of the PSFCH between the user apparatus 20B and the user apparatus 20A.

As illustrated in FIG. 4, the gap between a PSCCH/PSSCH and a PSFCH may be a gap from the head or tail of a slot including the PSCCH/PSSCH to the head or tail of a slot including the PSFCH, or may be a gap from the first or last symbol of the PSCCH/PSSCH to the first or last symbol of the PSFCH. The units of the gap may be slots, subslots, or symbols.

As the gap to be indicated to the base station apparatus 10, the following gap may be considered.

(1) The gap to be indicated to the base station apparatus 10 may be the largest gap among multiple gaps between a PSCCH/PSSCH and a PSFCH.
(2) The gap to be indicated to the base station apparatus 10 may be a period of a slot that can be periodically used for the PSFCH.
(3) As for the gap to be indicated to the base station apparatus 10, a gap may be indicated for each of multiple resource pools, or a common gap may be indicated for all resource pools. A gap may be indicated only for a preconfigured resource pool, or gaps may be indicated for both a resource pool that has been preconfigured and a resource pool that has been configured by the base station apparatus 10.
(4) The gap to be indicated to the base station apparatus 10 may be a gap that properly combines the gaps of (1), (2), and (3) described above.

As a modified example of an embodiment corresponding to the problem A, it is possible to consider indicating a time difference (by the units of slots, subslots, or symbols) between a PDCCH and a PUCCH/PUSCH from the base station apparatus 10 to the user apparatus 10A.

The time difference to be indicated to the user apparatus 10A may be a time difference between a PSCCH/PSSCH and a PUCCH/PUSCH.

The time difference to be indicated to the user apparatus 10A may be a time difference between a PSFCH and a PUCCH/PUSCH.

The time difference between a PDCCH and a PUCCH/PUSCH corresponds to the PDCCH-to-HARQ feedback timing described above. The field name in the DCI format for indicating the time difference between a PDCCH and a PUCCH/PUSCH may be, for example, PDCCH-to-HARQ feedback timing, or may be another name.

The time difference between a PSCCH/PSSCH and a PUCCH/PUSCH corresponds to the PSCCH/PSSCH-to-HARQ feedback timing described above. The field name in the DCI format for indicating the time difference between a PSCCH/PSSCH and a PUCCH/PUSCH may be, for example, "PSCCH/PSSCH-to-HARQ feedback timing", or may be another name.

The time difference between a PSFCH and a PUCCH/PUSCH corresponds to the PSFCH-to-HARQ feedback timing described above. The field name in the DCI format for indicating the time difference between a PSFCH and a PUCCH/PUSCH may be, for example, PSFCH-to-HARQ feedback timing, or may be another name.

Problem B

As an embodiment corresponding to the problem B on how to multiplex: an SL HARQ-ACK between the user apparatus 20A and the user apparatus 20B; and a Uu HARQ-ACK between the user apparatus 20A and the base station apparatus, it is possible to consider assuming that the SL HARQ-ACK and the Uu HARQ-ACK are not transmitted on the same resources (or on the same slot or on the same subslot).

For example, it is possible to consider not expecting the user apparatus 20A to receive a DCI format (e.g., a first DCI format) designating allocation of a PDSCH and feedback (i.e., Uu HARQ-ACK) in a certain slot; and another DCI format (e.g., a second DCI format) (explicitly or implicitly) designating scheduling of SL transmission and feedback in the same slot (i.e., SL HARQ-ACK). In other words, it is possible to consider deeming, as an error case, the case where the first DCI format and the second DCI format designating a Uu HARQ-ACK and an SL HARQ-ACK are received in the same slot as described above.

As an alternative, in the case of receiving a DCI format designating allocation of a PDSCH and feedback (Uu HARQ-ACK) in a certain slot, and another DCI format (explicitly or implicitly) designating scheduling of SL transmission and feedback (SL HARQ-ACK) in the same slot, the user apparatus 20A may drop or postpone the SL HARQ-ACK. Alternatively, the Uu HARQ-ACK may be dropped or postponed. Alternatively, depending on the implementation of the user apparatus 20A, either one of the SL HARQ-ACK or the Uu HARQ-ACK may be dropped or postponed. Alternatively, a HARQ-ACK of a link (e.g., Uu or SL) corresponding to scheduling earlier than the latest may be dropped or postponed. Alternatively, based on the type of cast such as unicast or groupcast, dropping or postponing may be performed. For example, the priorities may set in an order of SL-unicast HARQ-ACK>Uu HARQ-ACK>SL-groupcast HARQ-ACK.

Note that as another option, in the case of receiving a DCI format designating allocation of a PDSCH and feedback (Uu HARQ-ACK) in a certain slot, and another DCI format (explicitly or implicitly) designating scheduling of SL transmission and feedback (SL HARQ-ACK) in the same slot, it is also possible to consider multiplexing an SL HARQ-ACK and a Uu HARQ-ACK.

Problem C

As one example of the problem C, in the case where the same slot is indicated as a feedback slot of a Uu eMBB HARQ-ACK and an SL eMBB HARQ-ACK, it is possible to consider applying an embodiment similar to an embodiment corresponding to the problem B. In other words, it is possible to consider processing this case substantially the same way as in the case where the same slot is indicated for a Uu HARQ-ACK and an SL HARQ-ACK, by not taking the service type of eMBB into consideration.

As one example of the problem C, in the case where the same slot is indicated as a feedback slot of a Uu URLLC HARQ-ACK and an SL eMBB HARQ-ACK (i.e. in the case of Uu and SL), it is possible to consider treating the case in substantially the same way as in the case where the same slot is indicated as the feedback slot of a Uu URLLC HARQ-ACK and a Uu eMBB HARQ-ACK (i.e. in the case of Uu and Uu). For example, it is possible to consider dropping or postponing the SL eMBB HARQ-ACK, or multiplexing and transmitting the Uu URLLC HARQ-ACK and the SL eMBB HARQ-ACK at different coding rates. Alternatively, the SL eMBB HARQ-ACK may be dropped or postponed.

As one example of the problem C, in the case where the same slot is indicated as a feedback slot of a Uu URLLC HARQ-ACK and an SL URLLC HARQ-ACK (i.e. in the case of Uu and SL), it is possible to consider treating the case in substantially the same way as in the case where the same slot is indicated as the feedback slot of a Uu URLLC HARQ-ACK and a Uu URLLC HARQ-ACK (i.e. in the case of Uu and Uu). Alternatively, either one of the Uu URLLC HARQ-ACK or the SL URLLC HARQ-ACK may be dropped or postponed. For example, an SL URLLC HARQ-ACK may always be dropped or postponed; a Uu URLLC HARQ-ACK may always be dropped or postponed; either one of these may be dropped or postponed depending on the priority; or either one of these may be dropped or postponed depending on the implementation of the user apparatus 20A. Alternatively, both HARQ-ACKs may be multiplexed and transmitted.

As one example of the problem C, in the case where the same slot is indicated as a feedback slot of a Uu eMBB HARQ-ACK and an SL URLLC HARQ-ACK (the case of Uu and SL), it is possible to consider treating the case in substantially the same way as in the case where the same slot is indicated as the feedback slot of a Uu eMBB HARQ-ACK and a Uu URLLC HARQ-ACK (the case of Uu and Uu). Alternatively, the Uu eMBB HARQ-ACK may be dropped or postponed. Alternatively, the case where the same slot is indicated as a feedback slot of a Uu eMBB HARQ-ACK and an SL URLLC HARQ-ACK (the case of eMBB and URLLC) may be treated in substantially the same way as in the case where the same slot is indicated as the feedback slot of a Uu eMBB HARQ-ACK and an SL eMBB HARQ-ACK (the case of eMBB and eMBB).

As an embodiment corresponding to the problem C, it is possible to consider not distinguishing an SL HARQ-ACK based on the service type/priority level. For example, in the case where the same slot is indicated as the feedback slot of a Uu eMBB HARQ-ACK and an SL HARQ-ACK, regardless of whether the SL HARQ-ACK is an SL eMBB HARQ-ACK or an SL URLLC HARQ-ACK, an embodiment corresponding to the problem B may be applied.

Alternatively, regardless of whether the SL HARQ-ACK is an SL eMBB HARQ-ACK or an SL URLLC HARQ-ACK, it may be treated in substantially the same way as in the case where the same slot is indicated as the feedback slot of a Uu URLLC HARQ-ACK and an SL eMBB HARQ-ACK (i.e., in the case where the SL HARQ-ACK is eMBB).

Alternatively, regardless of whether the SL HARQ-ACK is an SL eMBB HARQ-ACK or an SL URLLC HARQ-ACK, it may be treated in substantially the same way as in the case where the same slot is indicated as the feedback slot of a Uu URLLC HARQ-ACK and an SL URLLC HARQ-ACK (i.e., in the case where the SL HARQ-ACK is URLLC).

Problem D

As an embodiment corresponding to the case where the type of HARQ-ACK codebook is a dynamic HARQ-ACK codebook (type 2) in the problem D, it is possible to consider generating a HARQ-ACK bit corresponding to DCI that has been actually received for scheduling SL transmission. Note that this embodiment may assume a case where a DAI (Downlink Assignment Index) is not transmitted on the DCI.

Alternatively, it is possible to consider generating a HARQ-ACK bit corresponding to the DCI transmission that is assumed to be scheduled for SL transmission. Note that this embodiment may assume a case where a DAI is transmitted on the DCI, and the user apparatus 20A can estimate the number of DCI items transmitted (to the user apparatus 20A) to schedule the SL transmission based on the DAI.

As an embodiment corresponding to the case where the type of HARQ-ACK codebook is a semi-static HARQ-ACK codebook (type 1) in the problem D, it is possible to consider generating a HARQ-ACK bit corresponding to DCI/PDSCH that can be received for scheduling SL transmission. Note that this embodiment may assume a case where no DAI is transmitted on the scheduling DCI.

The type of HARQ-ACK codebook for a sidelink (SL) may be configurable (in advance). Alternatively, it may be determined by the technical specifications.

A HARQ-ACK codebook of the same type as Uu is always configured. Alternatively, no additional configuration may be required other than the configuration of the HARQ-ACK codebook of Uu. In this case, when generating an SL HARQ-ACK codebook, operations of the user apparatus 20A may be determined by the configuration of the Uu HARQ-ACK codebook.

A HARQ-ACK codebook of a type different from Uu may be configured. For example, depending on whether the type of HARQ-ACK codebook configured for SL is the same as the type of HARQ-ACK codebook configured for Uu, different HARQ-ACK multiplexing rules may be applied when multiplexing a Uu HARQ-ACK and of an SL HARQ-ACK. For example, in the case where the type of HARQ-ACK codebook for SL is different from the type of HARQ-ACK codebook for Uu, processing of an embodiment similar to an embodiment corresponding to the problem B may be applied (e.g., scheduling that multiplexes a Uu HARQ-ACK and an SL HARQ-ACK is treated as an error case), and in the case where the type of HARQ-ACK codebook for SL is the same as the type of HARQ-ACK codebook for Uu, the HARQ-ACK bit of Uu and the HARQ-ACK bit of SL may be multiplexed.

Also, in the case where the type of HARQ-ACK codebook for SL is different from the type of HARQ-ACK codebook for Uu, the case may be processed according to the type of either one of the HARQ-ACK codebooks (e.g., according to Uu or according to SL).

Problem E

As an embodiment corresponding to the problem E or how to handle a collision between a PUCCH including an SL HARQ-ACK and a PUCCH including another uplink control type such as CSI/SR, it is possible to consider applying the same rule as a rule for handling a collision (collision with Uu) between a PUCCH including a Uu HARQ-ACK and a PUCCH including another uplink control type such as CSI/SR.

Alternatively, either one of the PUCCH including the SL HARQ-ACK or the PUCCH including another uplink control type such as CSI/SR may be dropped or postponed. For example, a PUCCH including an SL HARQ-ACK is transmitted, and a PUCCH including another uplink control type such as CSI/SR may be dropped or postponed.

Also, processing rules (SL CSI/SR rules) for a collision between a PUCCH including an SL HARQ-ACK and a PUCCH including another uplink control type such as CSI/SR of SL, and processing rules (Uu CSI/SR rules) for a collision between a PUCCH including an SL HARQ-ACK and a PUCCH including another uplink control type such as CSI/SR of Uu, may be configured as different rules.

Note that in the case where a PUCCH including an SL HARQ-ACK overlaps a PUSCH (in the case of SL), the same multiplexing rule can be applied as in the case where a PUCCH including a Uu HARQ-ACK overlaps a PUSCH (in the case of Uu). In other words, an SL HARQ-ACK can be multiplexed by regarding it as a Uu HARQ-ACK.

Effects

According to the above embodiments, the user apparatus 20A can appropriately transmit an SL HARQ-ACK to the base station apparatus 10.

According to an embodiment corresponding to the problem A, the user apparatus 20A can perform HARQ feedback in consideration of the SL transmission timing and processing time.

According to an embodiment corresponding to the problem B, the user apparatus 20A can maintain the performance of Uu HARQ-ACK feedback.

According to an embodiment corresponding to the problem C, the user apparatus 20A can take the performance of URLLC into account.

According to an embodiment corresponding to the problem D, the user apparatus 20A can prevent a mismatch (a difference in recognition) with the base station apparatus 10 with respect to the payload size of a HARQ-ACK.

(Apparatus Configuration)

Next, an example of a functional configuration of the base station apparatus 10 and the user apparatuses 20 (the user apparatus 20A and the user apparatus 20B are collectively referred to as the user apparatuses 20) that execute processing and operations described above will be described. The base station apparatus 10 and the user apparatus 20 include the functions of implementing the application examples described above. However, each of the base station apparatus 10 and the user apparatus 20 may include only a part of the functions of the application examples.

<Base Station Apparatus 10>

Figure 5:
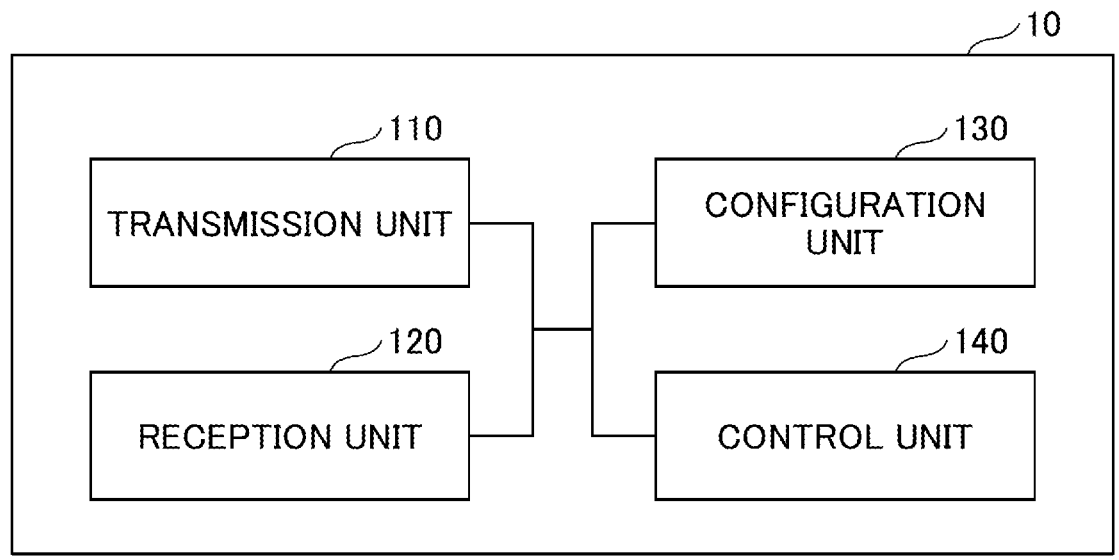
FIG. 5 is a diagram illustrating an example of a functional configuration of a base station apparatus 10 according to an embodiment.

FIG. 5 is a diagram illustrating an example of a functional configuration of the base station apparatus 10. As illustrated in FIG. 5, the base station apparatus 10 includes a transmission unit 110, a reception unit 120, a configuration unit 130, and a control unit 140. The functional configuration illustrated in FIG. 5 is merely an example. Functional partitioning and names of the functional units may be determined discretionarily as long as operations can be executed according to the embodiments of the present invention.

The transmission unit 110 includes a function of generating a signal to be transmitted to the user apparatus 20 and transmitting the signal by radio. Also, the transmission unit 110 transmits information on SL scheduling and the like, to the user apparatus 20. The reception unit 120 includes a function of receiving various signals transmitted from the user apparatus 20 and obtaining information on a higher layer, for example, from the received signal.

The configuration unit 130 stores configuration information set in advance and various items of configuration information to be transmitted to the user apparatus 20 in a memory device and reads out the configuration information from the memory device as needed. The contents of the configuration information include, for example, information related to a configuration of V2X and the like.

As described in the application examples, the control unit 140 performs processing related to a configuration for the user apparatus 20 to perform V2X. Also, a functional unit for transmitting signals in the control unit 140 may be included in the transmission unit 110, and a functional unit for receiving signals in the control unit 140 may be included in the reception unit 120.

<User Apparatus 20>

Figure 6:
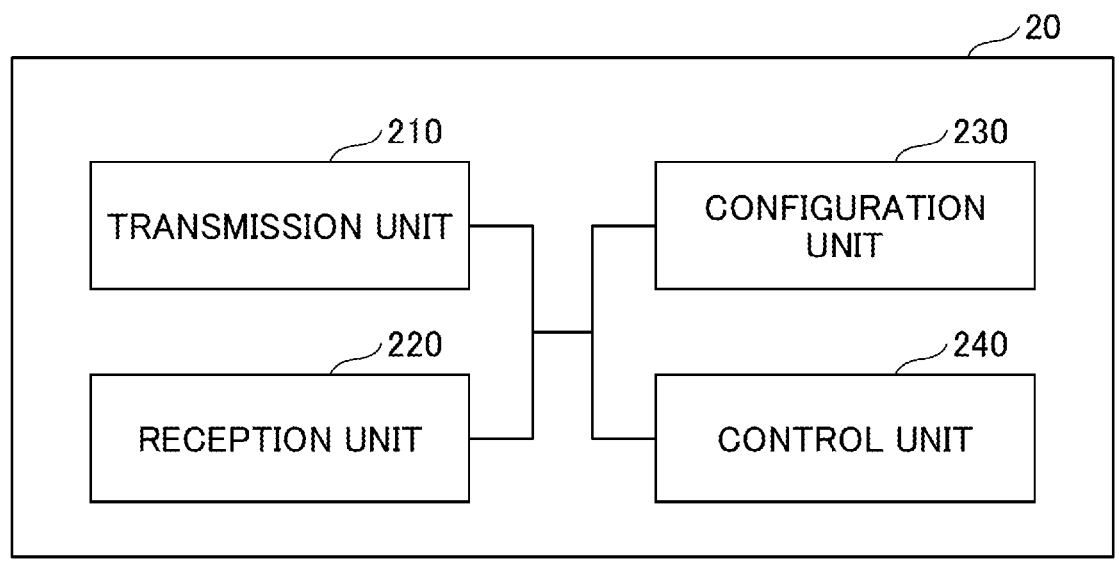
FIG. 6 is a diagram illustrating an example of a functional configuration of a user apparatus 20 according to an embodiment.

FIG. 6 is a diagram illustrating an example of a functional configuration of the user apparatus 20. As illustrated in FIG. 6, the user apparatus 20 includes a transmission unit 210, a reception unit 220, a configuration unit 230, and a control unit 240. The functional configuration illustrated in FIG. 6 is merely an example. Functional partitioning and names of the functional units may be determined discretionarily as long as operations can be executed according to the embodiments of the present invention.

The transmission unit 210 generates a transmission signal from transmission data, to transmit the transmission signal by radio. The reception unit 220 receives various signals by radio and obtains a signal of a higher layer from a received signal on the physical layer. Also, the reception unit 220 has a function of receiving SL scheduling transmitted from the base station apparatus 10.

The configuration unit 230 stores various items of configuration information received by the reception unit 220 from the base station apparatus 10 or the user apparatus 20 in a memory device, and reads out the configuration information from the memory device as needed. The configuration unit 230 also stores configuration information set in advance. The content of the configuration information is, for example, information related to V2X and HARQ processing, and the like.

The control unit 240 controls D2D communication executed with the other user apparatuses 20 as described in the application examples. Also, the control unit 240 performs V2X and HARQ processing. A functional unit for transmitting signals in the control unit 240 may be included in the transmission unit 210, and a functional unit for receiving signals in the control unit 240 may be included in the reception unit 220.

(Hardware Configuration)

The functional configuration diagrams (FIGS. 5 and 6) used for describing the above embodiments of the present invention show blocks in functional units. These functional blocks (components) are implemented by any combination of hardware and/or software. Further, the implementation of the functional blocks is not limited in particular. In other words, each functional block may be implemented by using one device that physically and/or logically couples multiple elements; or two or more devices that are physically and/or logically separated may be connected directly and/or indirectly (e.g., by wire and/or by radio) so as to implement the functional block.

Figure 7:
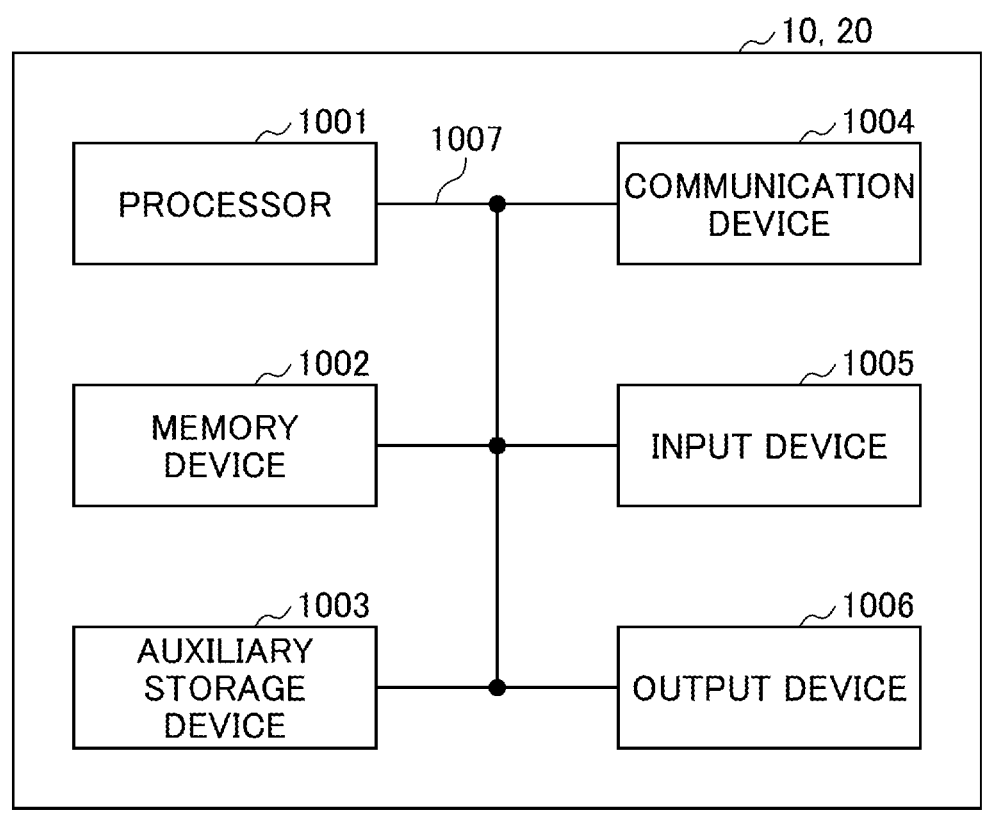
FIG. 7 is a diagram illustrating an example of a hardware configuration of the base station apparatus 10 and the user apparatus 20 according to an embodiment.

Also, for example, both of the base station apparatus 10 and the user apparatus 20 in an embodiment of the present invention may function as computers that perform processing according to the embodiment of the present invention. FIG. 7 is a diagram illustrating an example of a hardware configuration of the base station apparatus 10 or the user apparatus 20 according to an embodiment of the present invention. Each of the base station apparatus 10 and user apparatus 20 described above may be physically configured as a computer device that includes a processor 1001, a memory device 1002, an auxiliary storage device 1003, a communication device 1004, an input device 1005, an output device 1006, and a bus 1007.

Note that in the following description, the term "apparatus" can be read as a circuit, device, unit, or the like. The hardware configuration of the base station apparatus 10 and the user apparatus 20 may be configured to include one or more of the devices denoted as 1001 to 1006 in the drawings or may be configured without including some of the devices.

Each function in the base station apparatus 10 and the user apparatus 20 is implemented by loading predetermined software (a program) on the hardware such as the processor 1001 and the memory device 1002 so as to cause the processor 1001 to execute operations, to control communication by the communication device 1004, and to control reading and/or writing data in the memory device 1002 and the auxiliary storage device 1003.

The processor 1001 controls the entire computer, for example, by causing an operating system to run. The processor 1001 may be constituted with a central processing unit (CPU) that includes interfaces with peripheral devices, a controller, an arithmetic/logic unit, registers, and the like.

The processor 1001 also reads a program (a program code), a software module, data, and the like from the auxiliary storage device 1003 and/or the communication device 1004 to the memory device 1002 to perform various processes in accordance with these. As a program, a program that causes the computer to execute at least some of the operations described in the above embodiments is used. For example, the transmission unit 110, the reception unit 120, the configuration unit 130, and the control unit 140 of the base station apparatus 10 illustrated in FIG. 5 may be implemented by a control program that is stored in the memory device 1002 and runs on the processor 1001. Also, for example, the transmission unit 210, the reception unit 220, the configuration unit 230, and the control unit 240 of the user apparatus 20 illustrated in FIG. 6 may be implemented by a control program that is stored in the memory device 1002 and runs on the processor 1001. Although the various processes described above are assumed to be executed by the single processor 1001, these may be executed simultaneously or sequentially by two or more processors 1001. The processor 1001 may be implemented by one or more chips. Note that the program may be transmitted from a network via a telecommunication line.

The memory device 1002 is a computer-readable recording medium, and may be constituted with, for example, at least one of a ROM (Read-Only Memory), an EPROM (Erasable Programmable ROM), an EEPROM (Electrically Erasable Programmable ROM), a RAM (Random Access Memory), and the like. The memory device 1002 may be referred to as a register, a cache, a main memory (a main memory device), or the like. The memory device 1002 is capable of storing a program (a program code), a software module, and the like that are executable to implement processing according to an embodiment of the present invention.

The auxiliary storage device 1003 is a computer-readable recording medium and may be constituted with, for example, at least one of an optical disk such as a CD-ROM (Compact Disc ROM), a hard disk drive, a flexible disk, an optical magnetic disk (e.g., a compact disc, a digital versatile disc, a Blu-ray (registered trademark) disc, a smart card, a flash memory (e.g., a card, a stick, and a key drive), a floppy (registered trademark) disk, a magnetic strip, and the like. The auxiliary storage device 1003 may be referred to as an auxiliary storage device. The recording medium described above may be, for example, a database, a server, or any other suitable medium that includes the memory device 1002 and/or the auxiliary storage device 1003.

The communication device 1004 is hardware (a transceiver device) for communicating with computers via a wired network and/or a radio network, and is also referred to as, for example, a network device, a network controller, a network card, a communication module, and the like. For example, the transmission unit 110 and the reception unit 120 of the base station apparatus 10 may be implemented by the communication device 1004. Also, the transmission unit 210 and the reception unit 220 of the user apparatus 20 may be implemented by the communication device 1004.

The input device 1005 is an input device (e.g., a keyboard, a mouse, a microphone, a switch, a button, a sensor, etc.) to receive input from the outside. The output device 1006 is an output device (e.g., a display, a speaker, an LED lamp, etc.) to execute outputting to the outside. Note that the input device 1005 and the output device 1006 may have an integrated configuration (e.g., a touch panel).

Each of the devices such as the processor 1001 and the memory device 1002 is connected via the bus 1007 for communicating information. The bus 1007 may be configured by using a single bus or may be configured by using different buses between specific devices.

Each of the base station apparatus 10 and the user apparatus 20 may also be configured to include hardware such as a microprocessor, a digital signal processor (DSP), an ASIC (Application Specific Integrated Circuit), a PLD (Programmable Logic Device), and an FPGA (Field Programmable Gate Array), and with such hardware, some of or all of the functional blocks may be implemented. For example, the processor 1001 may be implemented by at least one of these hardware components.

Summary of Embodiments

As described above, according to an embodiment of the present invention, a user apparatus is provided that includes a transmission unit configured to transmit sidelink data based on information for sidelink scheduling received from a base station apparatus; and a reception unit configured to receive feedback information with respect to the sidelink data from a user apparatus that has received the sidelink data, wherein the transmission unit transmits to the base station apparatus, based on a predetermined assumption, first HARQ-ACK information that is based on the feedback information, and second HARQ-ACK information with respect to data received by the reception unit from the base station apparatus.

With the above configuration, techniques that specify how to feed back a HARQ-ACK in direct communication between terminals scheduled by a base station apparatus are provided.

Supplement to Embodiments

As above, the embodiment of the present invention has been described; note that the disclosed invention is not limited to the embodiments, and those skilled in the art would understand various modifications, revisions, alternatives, substitutions, and the like. Although the description has been made by using specific numerical examples to facilitate understanding of the invention, unless otherwise stated, these values are merely examples and any suitable values may be used. Partitioning of the items in the above description is not essential to the present invention, and matters described in two or more items may be used in combination as needed, or a matter described in one item may be applied to another matter described in another item (as long as no inconsistency is introduced). The boundaries of functional units or processing units in the functional block diagrams do not necessarily correspond to the physical boundaries of parts. The operations of the multiple functional units may be performed on a single physical part, or the operation of one functional unit may be performed on multiple physical parts. As for the processing steps described in the embodiments, the order of steps may be exchanged as long as no inconsistency is introduced. Although for the sake of convenience of describing processes, the base station apparatus 10 and the user apparatus 20 have been described by using the functional block diagrams, these apparatuses may be implemented by hardware, software, or a combination of these. The software executed by the processor included in the base station apparatus 10 according to the embodiment of the present invention and the software executed by the processor included in the user apparatus 20 according to the embodiment of the present invention, may be stored, respectively, in a random access memory (RAM), a flash memory, a read-only memory (ROM), an EPROM, an EEPROM, a register, a hard disk (HDD), a removable disk, a CD-ROM, a database, a server, or any other suitable recording medium.

Indication of information is not limited to the aspects and the embodiments described in the present description, and may be done by using other methods. For example, indication of information may be performed by physical layer signaling (e.g., DCI (Downlink Control Information), UCI (Uplink Control Information)), higher-layer signaling (e.g., RRC (Radio Resource Control) signaling, MAC (Medium Access Control) signaling, broadcast information (MIB (Master Information Block), SIB (System Information Block)), other signals, or a combination of these. Also, RRC signaling may also be referred to as an RRC message, and may also be, for example, an RRC connection setup message, an RRC connection reconfiguration message, or the like.

The aspects and the embodiments described in the present disclosure may be applied to systems utilizing LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), and other suitable systems; and/or next-generation systems extended based on these systems.

The processing steps, sequences, flowcharts, and the like of the aspects and the embodiments described in the present description may be reordered as long as no inconsistency is introduced. For example, a method described in the present description presents elements of various steps as an exemplary order, and is not limited to the particular order presented.

A specific operation described in the present description to be performed by the base station apparatus 10 may be performed by its upper node, depending on circumstances. In a network constituted with one or more network nodes having the base station apparatus 10, it is apparent that various operations performed for communication with the user apparatuses 20 may be performed by the base station apparatus 10 and/or other network nodes (for example, an MME or an S-GW may be considered, but not limited to these) other than the base station apparatus 10. In the above description, although a case has been exemplified in which there is a single network node other than the base station apparatus 10, the case may be exemplified as a combination of multiple other network nodes (e.g., MME and S-GW).

Each of the aspects and embodiments described in the present Description may be used singly, in combination, or switched over upon execution.

The user apparatus 20 may be referred to by an ordinary skilled person in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or any other suitable term.

The base station apparatus 10 may be referred to as an NB (NodeB), eNB (evolved NodeB), gNB, base station, or any other proper term, by those having ordinary skill in the art.

The terms "determination (or determining)" and "decision (or determining)" used in the present description may encompass a wide variety of operations. For example, "determination" and "decision" may include "determination" and "decision" made with judging, calculating, computing, processing, deriving, investigating, searching (looking up, search, inquiry) (e.g., search in a table, a database, or another data structure), or ascertaining. Also, "determination" and "decision" may include "determination" and "decision" made with, for example, receiving (e.g., receiving information), transmitting (e.g., transmitting information), input, output, or accessing (e.g., accessing data in a memory). Also, "determination" and "decision" may include "determination" and "decision" made with resolving, selecting, choosing, establishing, or comparing. In other words, "determination" and "decision" may include "determination" and "decision" made with a certain action.

A description using "based on" in the present description does not mean "based only on" unless otherwise specified. In other words, "based on" means both "based only on" and "based at least on".

As long as the terms "include", "including", and variations of these are used in the present description and the claims, it is intended that these terms are as comprehensive as the term "comprising". Further, it is intended that the term "or" used in the present description and the claims is not an exclusive OR.

In the entire present description, in the case where an article, for example, "a", "an", or "the" in English, is added by translation, these articles may include a plural form of the noun unless otherwise clarified in the context.

As above, the present invention has been described in detail; note that it is apparent to those skilled in the art that the present invention is not limited to the embodiments described in the present description. The present invention may be implemented as a modified and changed aspect without deviating from the purpose and scope of the present invention defined by the description of the claims. Accordingly, descriptions in the present description are intended for illustrative purposes and do not have any restrictive meaning with respect to the present invention.

DESCRIPTION OF REFERENCE SIGNS 10 base station apparatus
110 transmission unit
120 reception unit
130 configuration unit
140 control unit
20 user apparatus
210 transmission unit
220 reception unit
230 configuration unit
240 control unit
1001 processor
1002 memory device
1003 auxiliary storage device
1004 communication device 1005 input device
1006 output device

The invention claimed is:

1. A terminal comprising:
a receiver configured to receive, from a base station, control information specifying a number of slots corresponding to a time difference between
a slot for receiving feedback information received from another terminal, wherein the feedback information is for a data channel transmitted to the another terminal in a communication between terminals, and
a slot for transmitting an uplink control channel including first HARQ-ACK information corresponding to the feedback information; and
a transmitter configured to transmit, to the base station, the uplink control channel including the first HARQ-ACK information, based on the number of slots corresponding to the time difference,
wherein, if a codebook of the first HARQ-ACK information is a semi-static type of codebook, and if there is no scheduling for a data channel to be transmitted to the another terminal in the communication between the terminals, the transmitter feeds back a NACK bit.

2. The terminal as claimed in claim 1, wherein the transmitter transmits, to the base station, one of the first HARQ-ACK information and second HARQ-ACK information, according to priority.

3. The terminal as claimed in claim 1, wherein a type of codebook of the first HARQ-ACK information is the same as a type of a codebook of second HARQ-ACK information.

4. A base station comprising:
a transmitter configured to transmit, to a terminal, control information specifying a number of slots corresponding to a time difference between
a slot for the terminal to receive feedback information received from another terminal, wherein the feedback information is for a data channel transmitted to the another terminal in a communication between terminals, and
a slot for the terminal to transmit an uplink control channel including first HARQ-ACK information corresponding to the feedback information; and
a receiver configured to receive, from the terminal, the uplink control channel including the first HARQ-ACK information,
wherein, if a codebook of the first HARQ-ACK information is a semi-static type of codebook, and if there is no scheduling for a data channel to be transmitted to the another terminal by the terminal in the communication between the terminals, the receiver receives a NACK bit from the terminal.

5. A communication system comprising: a base station; and a terminal, wherein
the base station includes
a first transmitter of the base station configured to transmit, to the terminal, control information specifying a number of slots corresponding to a time difference between
a slot for the terminal to receive feedback information received from another terminal, wherein the feedback information is for a data channel transmitted to the another terminal in a communication between terminals, and
a slot for the terminal to transmit an uplink control channel including first HARQ-ACK information corresponding to the feedback information, and
a first receiver of the base station configured to receive, from the terminal, the uplink control channel including the first HARQ-ACK information, and
the terminal includes
a second receiver of the terminal configured to receive the control information from the base station, and
a second transmitter of the terminal configured to transmit, to the base station, the uplink control channel including the first HARQ-ACK information, based on the number of slots corresponding to the time difference,
wherein, if a codebook of the first HARQ-ACK information is a semi-static type of codebook, and if there is no scheduling for a data channel to be transmitted to the another terminal in the communication between the terminals, the second transmitter feeds back a NACK bit.

6. A communication method of a terminal, the communication method comprising:
receiving, from a base station, control information specifying a number of slots corresponding to a time difference between
a slot for receiving feedback information received from another terminal, wherein the feedback information is for a data channel transmitted to the another terminal in a communication between terminals, and
a slot for transmitting an uplink control channel including first HARQ-ACK information corresponding to the feedback information; and
transmitting, to the base station, the uplink control channel including the first HARQ-ACK information, based on the number of slots corresponding to the time difference,
wherein, if a codebook of the first HARQ-ACK information is a semi-static type of codebook, and if there is no scheduling for a data channel to be transmitted to the another terminal in the communication between the terminals, the transmitting includes feeding back a NACK bit.

* * * * *